US012688302B2

(12) United States Patent
Chen et al.

(10) Patent No.: US 12,688,302 B2
(45) Date of Patent: Jul. 21, 2026

(54) MODULAR SECURITY EVALUATION OF SOFTWARE ON DEVICES

(71) Applicant: Visa International Service Association, San Francisco, CA (US)

(72) Inventors: Yuexi Chen, Foster City, CA (US); Christian Aabye, Redwood City, CA (US); Janet Cookson, Denver, CO (US); Ian Javkin, Berkeley, CA (US); Geraldine Mitchley, Oakland, CA (US); Chackan Lai, San Jose, CA (US); Marc Kekicheff, Foster City, CA (US); Pawel Chrobok, Alameda, CA (US)

(73) Assignee: Visa International Service Association, San Francisco, CA (US)

( * ) Notice: Subject to any disclaimer, the term of this patent is extended or adjusted under 35 U.S.C. 154(b) by 171 days.

(21) Appl. No.: 18/547,039

(22) PCT Filed: Feb. 24, 2022

(86) PCT No.: PCT/US2022/017636
§ 371 (c)(1),
(2) Date: Aug. 18, 2023

(87) PCT Pub. No.: WO2022/182829
PCT Pub. Date: Sep. 1, 2022

(65) Prior Publication Data
US 2024/0143788 A1 May 2, 2024

Related U.S. Application Data

(60) Provisional application No. 63/153,257, filed on Feb. 24, 2021.

(51) Int. Cl.
G06F 21/57 (2013.01)
G06F 21/55 (2013.01)

(52) U.S. Cl.
CPC .......... G06F 21/577 (2013.01); G06F 21/552 (2013.01); G06F 2221/033 (2013.01)

(58) Field of Classification Search
CPC . G06F 21/577; G06F 21/552; G06F 2221/033
See application file for complete search history.

(56) References Cited

U.S. PATENT DOCUMENTS 9,195,574 B1    11/2015 Ryan et al.
11,436,127 B1* 9/2022 Raghavendran ...... G06F 11/368
(Continued)

FOREIGN PATENT DOCUMENTS

CN      104837150 A    8/2015
CN      108776640 A    11/2018
WO      2007055729 A2  5/2007

OTHER PUBLICATIONS

EP22760380.0 , "Extended European Search Report", Dec. 21, 2023, 7 pages.
(Continued)

*Primary Examiner* — Catherine Thiaw
*Assistant Examiner* — Daniel Elahian
(74) *Attorney, Agent, or Firm* — Kilpatrick Townsend & Stockton LLP

(57) ABSTRACT

A method includes receiving, by a network processing computer, software information from a development computer. The network processing computer can determine one or more logical modules of a plurality of logical modules based on the software information. The network processing computer can provide the one or more logical modules to a testing computer. The testing computer evaluates one or more software modules corresponding to the software information using the one or more logical modules. The network processing computer receives a security evaluation report from the testing computer based on the evaluation of the one or more software modules using the one or more logical (Continued)

modules. The network processing computer creates a security evaluation summary based on the security evaluation report.

20 Claims, 4 Drawing Sheets

(56)                    References Cited

U.S. PATENT DOCUMENTS

| | | | |
|---|---|---|---|
| 2005/0273859 A1 | 12/2005 | Chess et al. | |
| 2009/0204851 A1* | 8/2009 | Bengtsson | G06F 11/3672 |
| | | | 714/38.11 |
| 2010/0077479 A1* | 3/2010 | Viljoen | G06F 21/56 |
| | | | 726/22 |
| 2010/0281248 A1 | 11/2010 | Lockhart et al. | |
| 2015/0324571 A1* | 11/2015 | Hernoud | G06F 21/34 |
| | | | 726/5 |
| 2017/0300698 A1* | 10/2017 | Chawla | G06F 21/577 |
| 2017/0329701 A1 | 11/2017 | Patnaik et al. | |
| 2019/0114435 A1* | 4/2019 | Bhalla | G06F 21/55 |
| 2019/0243752 A1 | 8/2019 | Bakshi et al. | |
| 2020/0081825 A1* | 3/2020 | Parbhane | G06F 11/3688 |
| 2020/0167477 A1* | 5/2020 | Ionescu | G06F 21/577 |
| 2020/0285756 A1 | 9/2020 | Bhalla et al. | |
| 2021/0297438 A1* | 9/2021 | Hicks | G06F 11/076 |

OTHER PUBLICATIONS

PCT/US2022/017636 , "International Search Report and Written Opinion", Jun. 7, 2022, 10 pages.

Application No. EP22760380.0 , Office Action, Mailed On Oct. 9, 2025, 7 pages.

Application No. CN 202280016779.9, Notice of First Office Action, 26 pages; Apr. 30, 2026.

* cited by examiner

MODULAR SECURITY EVALUATION OF SOFTWARE ON DEVICES

CROSS-REFERENCES TO RELATED APPLICATIONS

This application is a National Stage of International Application No. PCT/US2022/017636, filed Feb. 24, 2022, which claims priority to U.S. Provisional Application 63/153,257, filed on Feb. 24, 2021, which are incorporated herein by reference for all purposes in its their entirety.

BACKGROUND

Various software applications (e.g., such as tap to phone (TTP) solutions) can be run on commercial-off-the-shelf (COTS) devices like Android and iOS devices. Software applications can handle sensitive data (e.g., payment account data, social security numbers, biometric information, passwords, etc.), and they should be evaluated for security. Existing security evaluation techniques and frameworks (e.g., payment card industry (PCI) contactless payments of COTS (CPoC)) only support end-to-end solutions, meaning that any change in the software will require a completely new security evaluation on the entire software (and not just the changed portion of software). Due to the need for frequent updates (e.g., feature enhancements, bug fixes, branding enhancements, internationalization modifications, etc.) of smartphone software applications, the existing security evaluation framework requires many computing resources and takes a long time.

Embodiments of the disclosure address this problem and other problems individually and collectively.

SUMMARY

One embodiment is related to a method comprising: receiving, by a network processing computer, software information from a development computer; determining, by the network processing computer, one or more logical modules of a plurality of logical modules based on the software information; providing, by the network processing computer, the one or more logical modules to a testing computer, wherein the testing computer evaluates one or more software modules corresponding to the software information using the one or more logical modules; receiving, by the network processing computer, a security evaluation report from the testing computer based on the evaluation of the one or more software modules using the one or more logical modules; and creating, by the network processing computer, a security evaluation summary based on the security evaluation report.

Another embodiment of the invention is directed to a network processing computer comprising: a processor; and a computer readable medium coupled to the processor, the computer readable medium comprising code, executable by the processor, to implement a method comprising: receiving, by the network processing computer, software information from a development computer; determining, by the network processing computer, one or more logical modules of a plurality of logical modules based on the software information; providing, by the network processing computer, the one or more logical modules to a testing computer, wherein the testing computer evaluates one or more software modules corresponding to the software information using the one or more logical modules; receiving, by the network processing computer, a security evaluation report from the testing computer based on the evaluation of the one or more software modules using the one or more logical modules; and creating, by the network processing computer, a security evaluation summary based on the security evaluation report.

Another embodiment of the invention is directed to a system comprising: a network processing computer comprising: a first processor; and a first computer readable medium coupled to the first processor, the first computer readable medium comprising code, executable by the first processor, to implement a first method comprising: receiving, by the network processing computer, software information from a development computer; determining, by the network processing computer, one or more logical modules of a plurality of logical modules based on the software information; providing, by the network processing computer, the one or more logical modules to a testing computer; receiving, by the network processing computer, a security evaluation report from the testing computer; and creating, by the network processing computer, a security evaluation summary based on the evaluation; and the testing computer comprising: a second processor; and a second computer readable medium coupled to the second processor, the second computer readable medium comprising code, executable by the second processor, to implement a second method comprising: receiving, by the testing computer, the one or more logical modules from the network processing computer; evaluating, by the testing computer, one or more software modules using the one or more logical modules, wherein the one or more software modules corresponding to the software information; generating, by the testing computer, the security evaluation report indicating whether or not the one or more software modules satisfy security rules included in each of the one or more logical modules; and providing, by the testing computer, the security evaluation report to the network processing computer.

Further details regarding embodiments of the disclosure can be found in the Detailed Description and the Figures.

DETAILED DESCRIPTION

Figure 1:
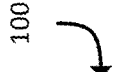
FIG. 1 shows a block diagram of a security evaluation system according to embodiments.
Figure 1:
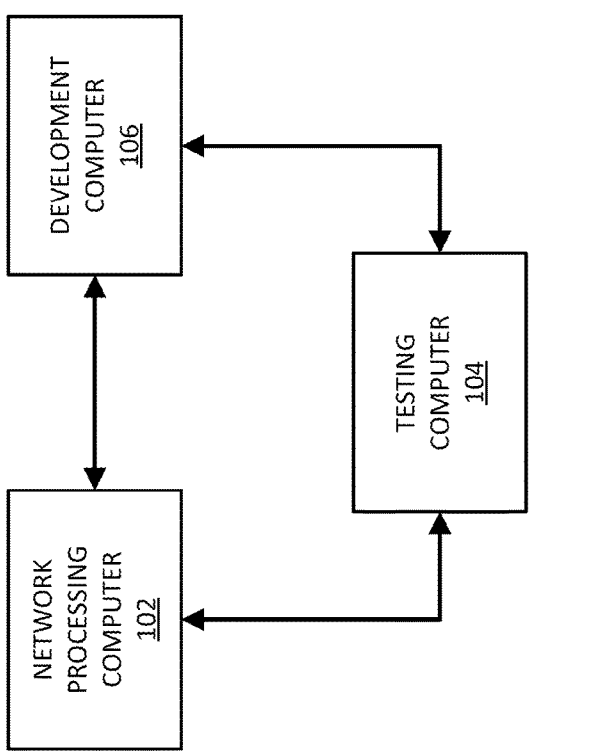

Prior to discussing embodiments of the disclosure, some terms can be described in further detail.

A "processing network computer" may include a server computer used for processing network data. In some embodiments, the processing network computer may be coupled to a database and may include any hardware, software, other logic, or combination of the preceding for servicing the requests from one or more client computers. The processing network computer may comprise one or more computational apparatuses and may use any of a variety of computing structures, arrangements, and compilations for servicing the requests from one or more client computers. In some embodiments, the processing network computer may operate multiple server computers. In such embodiments, each server computer may be configured to process transactions for a given region or handles transactions of specific types based on transaction data.

The processing network computer may include data processing subsystems, networks, and operations used to support and deliver authorization services, exception file services, and clearing and settlement services. An exemplary processing network computer may include VisaNet™. Networks that include VisaNet™ can process credit card transactions, debit card transactions, and other types of commercial transactions. VisaNet™ includes an integrated payments system (Integrated Payments system) which processes authorization requests and a Base II system, which performs clearing and settlement services. The processing network computer may use any suitable wired or wireless network, including the Internet.

A "testing computer" can include an electronic device for performing a procedure intended to establish the quality, performance, or reliability of something.

A testing computer can test software to determine its quality, performance, and/or reliability.

A "development computer" can include an electronic device for aiding in the creation of something. A development computer can develop software.

A "software module" can include a part of a program (e.g., software). Software can comprise one or more software modules that may not be combined until the program is linked. A software module can include one or more routines.

"Software information" can include data that represents or conveys data regarding software. In some embodiments, software information can include data the represents or conveys data regarding one or more software modules. Software information can also include data that indicates what a piece of associated software is meant to perform (e.g., user authentication, PIN processing, etc.). Software information can include a development computer identifier that identifies a particular development computer utilized to develop the software. Software information can include developer information (e.g., company name, contact information, etc.), a software name, a version, build information, digital signature(s), a list of supported modules, any dependencies, any module environment(s), and/or included $3^{rd}$ party software development kits.

A "software information identifier" can include a sequence of characters used to identify or refer to software information. A software information identifier can include an alphanumeric value that is unique to an instance of software information. A software information identifier can be assigned to software information.

A "logical module" can include part of a plurality of security requirements. A logical module can be logically self-contained so security requirements of the logical module can be met without other logical module's support. In some embodiments, a logical module can be implanted as computer code, and an API or other boundary may be used by a software developer to access security rules in the logical module. A logical module can include one or more security rules.

"Security rules" can include a process or an outcome relating to security. In embodiments of the invention, a security rule can include a process or outcome that can be satisfied or completed by one or more software modules. In some cases, a security rule can indicate how to achieve security in a particular setting. For example, security rules can relate to random number generation rules, cryptography rules, secure channel generation rules, correlatable data rules, tamper and reverse-engineering protection rules, online processing rules, application authenticity rules, secure provisioning rules, data encryption rules, and/or attestation mechanism rules. A security rule, once implemented, can increase the security of a software module. A particular security rule can be included in one or more than one logical module.

An "environment indicator" can indicate an environment in which one or more corresponding software modules can or will be executed. An environment indicator can be an alphanumeric value.

An "environment" can include conditions or surroundings within which a software module operates. An environment can be a physical environment or a virtual environment. An environment can be, for example, inside a device operating system, inside device hardware, inside a cloud based application, etc.

A "security evaluation report" can include an account given of a security matter. A security evaluation report can be a report that indicates how software comprising one or more software modules performed in a security assessment. A security evaluation report can include a plurality of security rule outcome indicators, which indicate whether or not the software comprising the one or more software modules passed a particular security rule. The security evaluation report can include a security rule outcome indicator for each security rule of the one or more logical modules. The security evaluation report can include security rule outcome indicators that indicate either pass or fail.

A "security evaluation summary" can include a brief statement of the main outcome of a security evaluation. A security evaluation summary can be created from a security evaluation report. A security evaluation summary can include an allowance indicator that indicates whether a development computer can proceed with distributing the one or more evaluated software modules.

An "allowance indicator" can include an indication of whether something is allowed. An allowance indicator can be an alphanumeric value that indicates whether a development computer is allowed to distribute an application comprising one or more software modules. An allowance indicator can be, for example, "true" or "false."

A "processor" may include a device that processes something. In some embodiments, a processor can include any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers).

Embodiments of the disclosure allow for 1) converting end-to-end security requirements into self-contained logical modules with boundaries, 2) obtaining relevant security rules from one or more logical modules based on a software's logical capability, 3) converting the logical requirements to implementable security tests on a software target, and 4) summarizing the practical security tests result into a logical security summary that can lead to a security approval outcome.

End-to-end security goals and requirements can be converted and grouped into logical modules. A logical module can contain security rules that pertain to a particular security concern. For example, a logical module can be a contactless kernel logical module, a PIN capture logical module, an off the shelf device attestation logical module, gateway connector logical module, etc.

The security rules can include any logical security rules. For example, a security rule can be that "a secure provisioning process must implement principles of perfect forward secrecy." Such a security rule can be grouped into the attestation logical module, for example. As another example, a security rule can be that "account data is to be encrypted within an application as soon as it is received by the application and always prior to transmission outside of the device that the application is stored on." Such a security rule can be grouped into more than one logical module, such as the contactless kernel logical module, the PIN capture logical module, and the gateway connector logical module.

A development computer can develop software comprising one or more software modules. The development computer can obtain authorization by a network processing computer to distribute the software (e.g., via an application store, etc.). The development computer can communicate software information to the network processing computer, so that the network processing computer can determine one or more logical modules that include rules that must be satisfied by the software associated with the software information for distribution authorization. The network processing computer can communicate with a testing computer to determine whether the one or more software modules satisfy the security rules of the one or more logical modules. If the one or more software modules satisfies the security rules of the one or more logical modules, the network processing computer can authorize the development computer to distribute the software.

FIG. 1 shows a system 100 according to embodiments of the disclosure. The system 100 comprises a network processing computer 102, a testing computer 104, and a development computer 106. The network processing computer 102 can be in operative communication with the testing computer 104 and the development computer 106. The testing computer 104 can be in operative communication with the development computer 106.

For simplicity of illustration, a certain number of components are shown in FIG. 1. It is understood, however, that embodiments of the invention may include more than one of each component. In addition, some embodiments of the invention may include fewer than or greater than all the components shown in FIG. 1.

Messages between at least the devices in FIG. 1 can be transmitted using a secure communications protocols such as, but not limited to, File Transfer Protocol (FTP); Hyper-Text Transfer Protocol (HTTP); Secure Hypertext Transfer Protocol (HTTPS), SSL, ISO (e.g., ISO 8583) and/or the like. The communications network may include any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. The communications network can use any suitable communications protocol to generate one or more secure communication channels. A communications channel may, in some instances, comprise a secure communication channel, which may be established in any known manner, such as through the use of mutual authentication and a session key, and establishment of a Secure Socket Layer (SSL) session.

The network processing computer 102 can include a computer or server computer. The network processing computer 102 can be configured to determine one or more logical modules of a plurality of logical modules that relate to received software information. The software information can include information regarding one or more software modules.

In embodiments, the logical modules can be separated from the implementation of the code (e.g., software modules). As such, the logical modules can be utilized in a logical layer, whereas the software modules can be tested in an implementation layer. The modules are separated at the logical level, instead of in the code/binary/service implementation level. Logical modules at the logical level can be divided, which means one logical module does not rely on other logical module(s) to fulfill its security requirements (i.e., the logical module is self-contained). A software module itself can be implemented by line(s) of code, method(s), procedure(s), binary(es), or service(s).

Furthermore, one software module may implement security requirements from multiple logical modules, in which case the logical modules are separated logically but the code implementation of software modules cannot be divided. For example, a root detection code may be required to be inserted in contactless kernel code and compiled into one binary, whereas a contactless kernel logical module (MCTL) and a device attestation logical module (MATT) are still logically separate, but can't not be divided in the implementation code.

The testing computer 104 can include a computer configured to perform one or more tests on one or more software modules to determine whether the one or more software modules satisfy security rules included in one or more logical modules.

The development computer 106 can include a computer configured to develop software. The development computer 106 can be operated by a software developer. The development computer 106 can generate software information that describes software that is developed or is being developed by the development computer 106. The development computer 106 can request the network processing computer 102 to authorize the development computer 106 to distribute the software.

A logical module may not rely on other logical module(s) to fulfill its security requirements or compensate for its security vulnerability. For example, an SDK that implements software module(s) may not rely on other software outside the SDK or configuration to fulfill its security requirements or compensate for its security vulnerability. The security compliance on software modules and the security strength of the SDK may not be downgraded by other software or configuration. For example, a device attestation SDK may not rely on a tap to phone application to invoke its method(s) to perform device software integrity check. It may perform this task autonomously to meet corresponding security requirements.

In embodiments of the invention, an application can satisfy the security rules or all relevant logical modules, without relying on any security features or measures that may be provided by a device running the application.

Figure 2:
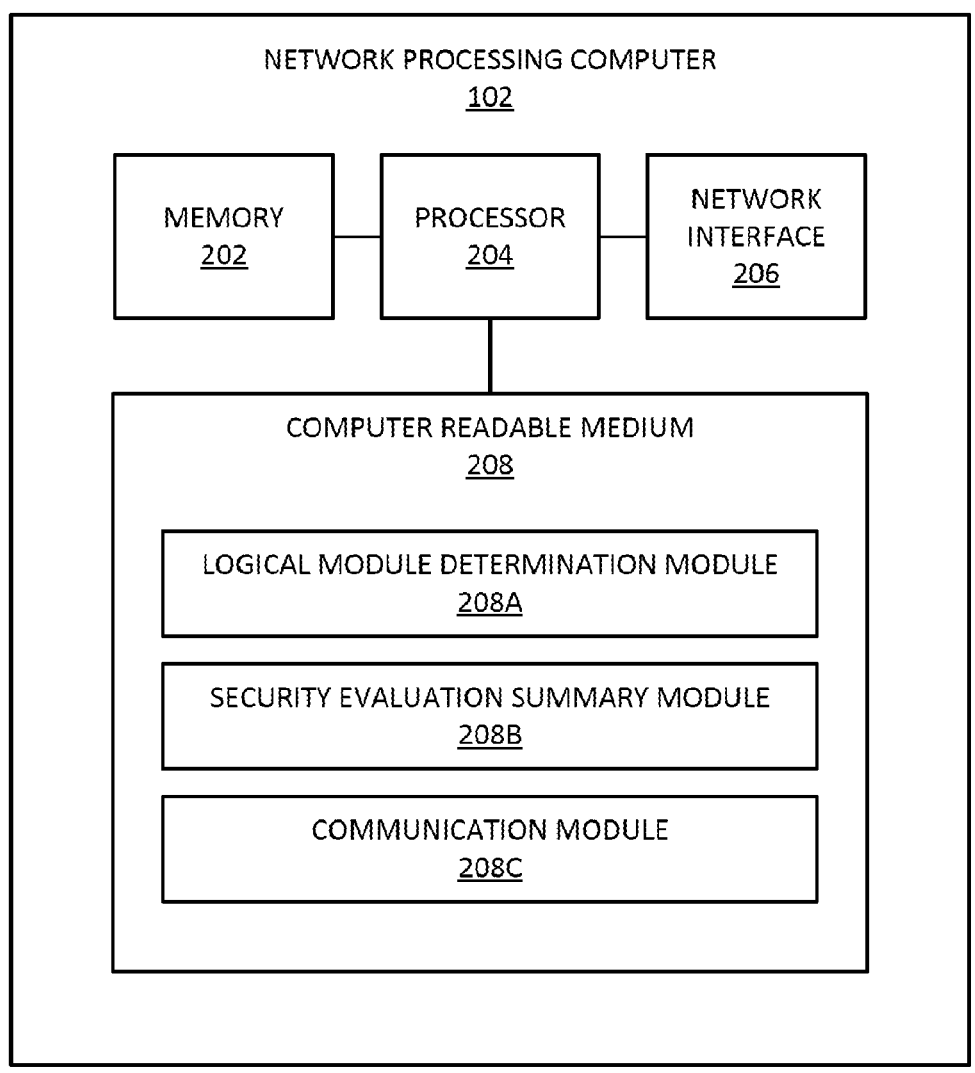
FIG. 2 shows a block diagram of components of a network processing computer according to embodiments.

FIG. 2 shows a block diagram of a network processing computer 102 according to embodiments. The exemplary network processing computer 102 may comprise a processor 204. The processor 204 may be coupled to a memory 202, a network interface 206, and a computer readable medium 208. The computer readable medium 208 can comprise several modules including a logical module determination module 208A, a distribution authorization module 208B, and a communication module 208C. In some embodiments, the network processing computer 102 may be in operative communication with a database.

The memory 202 can be used to store data and code. For example, the memory 202 can store logical modules, security rules, software information, software information identifiers, environment indicators, allowance indicators, etc. The memory 202 may be coupled to the processor 204 internally or externally (e.g., cloud-based data storage), and may comprise any combination of volatile and/or non-volatile memory, such as RAM, DRAM, ROM, flash, or any other suitable memory device.

The computer readable medium 208 may comprise code, executable by the processor 204, for performing a method comprising: receiving, by a network processing computer, software information from a development computer; determining, by the network processing computer, one or more logical modules of a plurality of logical modules based on the software information; providing, by the network processing computer, the one or more logical modules to a testing computer, wherein the testing computer evaluates one or more software modules corresponding to the software information using the one or more logical modules; receiving, by the network processing computer, a security evaluation report from the testing computer based on the evaluation of the one or more software modules using the one or more logical modules; and creating, by the network processing computer, a security evaluation summary based on the security evaluation report.

The logical module determination module 208A can comprise code or software executable by the processor 204, for determining one or more logical modules. The logical module determination module 208A, in conjunction with the processor 204, can determine or more logical modules that relate to received software information. The software information can indicate the capabilities of the related software, which comprises one or more software modules. The logical module determination module 208A, in conjunction with the processor 204, can evaluate the software information to determine which capabilities of the related software (e.g., user authentication, PIN management, secure data communication of a communication channel, etc.) correspond to one or more logical modules.

For example, the logical module determination module 208A, in conjunction with the processor 204, can obtain software information including an indication (such as a data tag) that the software intends to interact with a contactless card via a device's NFC controller. The logical module determination module 208A, in conjunction with the processor 204, can determine that the indication that the software intends to interact with a contactless card via a device's NFC controller corresponds to a logical module of "contactless kernel," which includes a plurality of security rules relating to contactless kernels.

In some embodiments, the software information can include an environment indicator that indicates an intended environment for the software to execute within. The logical module determination module 208A, in conjunction with the processor 204, can filter the plurality of logical modules using the environment indicator. For example, the logical module determination module 208A, in conjunction with the processor 204, can filter out logical modules that are not tagged, or otherwise associated with, the environment indicator included in the software information. For example, the environment indicator can be "RCLD," which indicates that the software is intended to execute in the cloud. The logical module determination module 208A, in conjunction with the processor 204, can filter out logical modules that are not tagged with RCLD from consideration on which logical modules are to be utilized when testing the software.

The distribution authorization module 208B can comprise code or software executable by the processor 204, for determining whether or not to authorize distribution of software. The distribution authorization module 208B, in conjunction with the processor 204, can receive a security evaluation report from a testing computer based on an evaluation of one or more software modules using one or more logical modules. The distribution authorization module 208B, in conjunction with the processor 204, can generate a security evaluation summary that includes an allowance indicator, which indicates whether or not the development computer can proceed with distributing the one or more software modules. The distribution authorization module 208B, in conjunction the processor 204, can generate the allowance indicator based on the security evaluation report that can indicate whether or not the one or more software modules satisfies each of the plurality or rules of each of the one or more logical modules.

For example, the distribution authorization module 208B, can receive a security evaluation report that the one or more software modules satisfies 8 of 10 security rules indicated by two different logical modules. The distribution authorization module 208B, in conjunction with the processor 204, can generate an allowance indicator that indicates that the development computer is not authorized to distribute the one or more software modules, since not all security rules were satisfied.

The communication module 208C can comprise code or software executable by the processor 204, for communicating with other devices. The communication module 210 may be configured or programmed to perform some or all of the functionality associated with receiving, sending, and generating electronic messages for transmission through the network processing computer 102. When an electronic message is received by the network processing computer 102 via the network interface 206, it may be passed to the communication module 208C. The communication module 208C may identify and parse the relevant data based on a particular messaging protocol used in the network processing computer 102. The communication module 208C may then transmit any received information to an appropriate module within the network processing computer 102. The communication module 208C may also receive information from one or more of the modules in the network processing computer 102 and generate an electronic message in an appropriate data format in conformance with a transmission protocol used in the network processing computer 102 so that the message may be sent to one or more entities within the system 100 of FIG. 1 (e.g., to the testing computer 104 or the development computer 106). The electronic message may then be passed to the network interface 206 for transmission.

The network interface 206 may include an interface that can allow network processing computer 102 to communicate with external computers. The network interface 206 may enable the network processing computer 102 to communicate data to and from another device (e.g., a testing computer, a development computer, etc.). Some examples of the network interface 206 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by the network interface 206 may include Wi-Fi™. Data transferred via the network interface 206 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 206 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

In some embodiments, the network processing computer 102 may be in operative communication with a database (not shown). The database can include any suitable database. The database may be a conventional, fault tolerant, relational, scalable, secure database such as those commercially available from Oracle™ or Sybase™. For example, the network processing computer 102 can be in operative communication with a logical module database that stores a plurality of logical modules.

Figure 3:
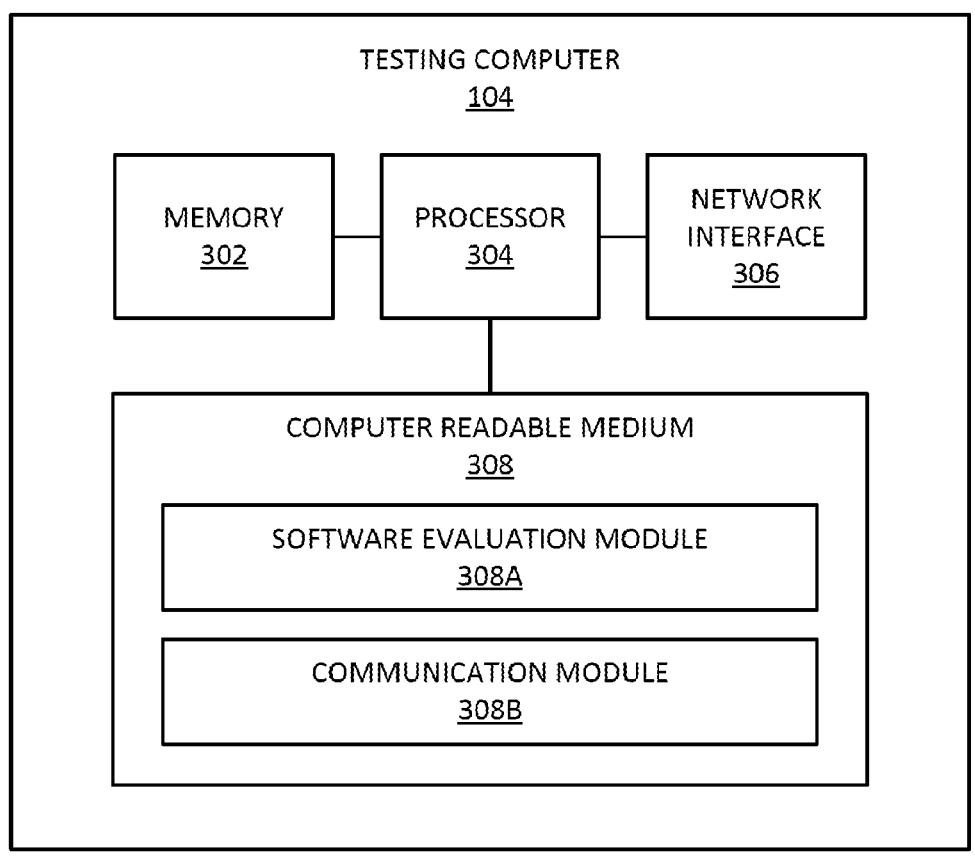
FIG. 3 shows a block diagram of components of a testing computer according to embodiments.

FIG. 3 shows a block diagram of a testing computer 104 according to embodiments. The exemplary testing computer 104 may comprise a processor 304. The processor 304 may be coupled to a memory 302, a network interface 306, and a computer readable medium 308. The computer readable medium 308 can comprise one or modules including a software evaluation module 308A and a communication module 308B.

The memory 302 can be used to store data and code. For example, the memory 302 can store software information identifiers, logical modules, security rules, etc. The memory 302 may be coupled to the processor 304 internally or externally (e.g., cloud based data storage), and may comprise any combination of volatile and/or non-volatile memory, such as RAM, DRAM, ROM, flash, or any other suitable memory device.

The computer readable medium 308 may comprise code or software, executable by the processor 304, for performing a method comprising: receiving, by the testing computer, the one or more logical modules from the network processing computer; evaluating, by the testing computer, one or more software modules using the one or more logical modules, wherein the one or more software modules corresponding to the software information; generating, by the testing computer, the security evaluation report indicating whether or not the one or more software modules satisfy security rules included in each of the one or more logical modules; and providing, by the testing computer, the security evaluation report to the network processing computer.

The software evaluation module 308A can comprise code or software, executable by the processor 304, for evaluating software. The software evaluation module 308A, in conjunction with the processor 304, can evaluate one or more software modules. The software evaluation module 308A, in conjunction with the processor 304, can evaluate whether or not one or more software modules satisfy security rules indicated by one or more logical modules. The software evaluation module 308A, in conjunction with the processor 304, can evaluate each security rule individually of one another.

For example, the software evaluation module 308A, in conjunction with the processor 304, can obtain a first security rule of a plurality of security rules. The software evaluation module 308A, in conjunction with the processor 304, can determine whether or not the one or more software modules satisfy the first security rule by testing the code for compliance with the first security rule. As an example, the first security rule can be that "the software must ensure that neither a cleartext secret nor private cryptographic keys are exposed as cleartext in the device operating system memory." The software evaluation module 308A, in conjunction with the processor 304, can evaluate the software to determine if the software exposes a cleartext secret or a private cryptographic key to the device operating system memory. If the software does not expose the cleartext secret or the private cryptographic key to the device operating system memory, then the software evaluation module 308A, in conjunction with the processor 304, can determine that the software passes the first security rule.

The communication module 308B can be similar to the communication module 208B as illustrated in FIG. 2 and will not be duplicated here.

The network interface 306 can be similar to the network interface 206 of FIG. 2, and will not be duplicated here.

The software modules described herein can be implemented in different environments. For example, binary, which implements a software module, may be executed in different environment(s) as per design and implementation. Table 1 illustrates four example environments (e.g., residencies). A software module may have one or multiple environment(s) depending on its software design and implementation.

TABLE 1

| Module Environments | |
|---|---|
| [RAPP] | Module is inside an application (e.g., an interaction application) |
| [ROS] | Module is inside the COTS device OS |
| [RHW] | Module is in device hardware |
| [RCLD] | Module is in the cloud |

The different software module environments will be described in reference to a tap to phone application. A first software module environment can be that the software module is inside of an application (e.g., a tap to phone application). In such an environment, the module binary is embedded in the software application and is deployed with the software application. The embedding can be done in binary or source code level. The software module's binary runs in the software application user space on the device's main application processor.

A second software module environment can be that the software module is inside of the device's operating system (OS). The software module binary is embedded in the COTS device OS and is deployed with the OS. The module binary is invoked by the tap to phone application. The module binary can run the tap to phone application in a user space, in an OS user space, in an OS kernel space, or in a separate virtualized OS (e.g., a TEE). The software module binary runs on the COTS device's main application processor.

A third software module environment can be that the software module is in the device hardware. The software module binary is embedded in the hardware and is deployed with the COTS device. The software module binary is invoked by the tap to phone application through an OS API or device driver. The software module binary runs on a separate secure processor (e.g., TPM, Secure Element, etc.) other than the COTS device's main application processor, or it runs on a separate logical core in the COTS device's application processor.

A fourth software module environment can be that the software module is in the cloud. The software module is deployed on a cloud server with a remote programming interface exposed to the tap of phone application on the COTS device.

I. Logical Modules

Table 2, below, illustrates four different logical modules with corresponding security rules and environment indicator filters. The logical modules can include, but are not limited to, a contactless kernel logical module (MCTL), a PIN capture logical module (MPIN), a device attestation logical module (MATT), and a gateway connector logical module (MGWC).

The MCTL can relate to interactions with a contactless card via a COTS device's NFC controller, capture and protects card payment data. The MPIN can relate to capturing a user's online PIN securely on COTS device. The MATT can relate to enrolling and monitoring a COTS device, including hardware, OS and tap to phone applications as well as ensuring the tap to phone application is secured on the COTS device. The MGWC can relate to using transport key/credential to encrypt and send captured card data and a user's online PIN to endpoint securely.

The security rules illustrated in Table 2 are provided as examples and it is understood that the security, logical modules groupings, and environment indicators can differ from the examples provided in Table 2.

TABLE 2

| Logical Modules, Environment Indicators (EI), and Security Rules | | |
| --- | --- | --- |
| Included in Logical Modules | EI | Security Rules |
| All | All | Documentation<br>1.1.1 Documentation detailing all sensitive services implemented by the solution and its components should exist, be reviewed at least annually and be updated as necessary. This should include, but is not limited to, key management, signing of applications, and signing of updates to the attestation services or configuration. |
| All | All | Integrity<br>1.1.2 All sensitive services should be protected against unauthorized modification (i.e., integrity protection) and against unauthorized access (i.e., access control). |
| MCTL<br>MPIN<br>MGWC | All | Random Numbers<br>1.2.1 Documentation to identify all random number generation functions and reliance on random data used in the solution should exist and be maintained.<br>1.2.2 Any random numbers used on the COTS device for security purposes should be seeded from a value provided from a trusted source combined with input from the Random Number Generator (RNG) on the COTS platform or within the CPoC application, and at least two other sources of non-deterministic data (such as user input timing and values collected from lowest bits of on-device analog sensors).<br>1.2.3 The DRNG should be reseeded each time the CPoC application launches.<br>1.2.4 The seed value should never be stored in non-volatile memory.<br>1.2.5 The CPoC application should use an assessed RNG where cryptographic algorithms require the use of random numbers. |
| MCTL<br>MPIN<br>MGWC | RCLD | 1.2.6 Any random numbers used on a back-end system for security purposes should be seeded from a value provided initially from the NRNG on at least a FIPS 140-2 Level 3 (or FIPS 140-3 equivalent) or PCI-approved HSM. |
| All | All | Cryptography<br>1.3.1 Documentation should exist that identifies cryptographic processes and operations used by the solution for security services. Documentation should include, but not be limited to, the following:<br>Cryptographic algorithms used and where they are used<br>Identification of all keys, the complete key hierarchy, their purposes, and their crypto periods<br>Key-generation or key-agreement processes<br>Description of cryptographic key protection mechanisms<br>1.3.2 All cryptographic processes provided by the solution should adhere to Minimum and Equivalent Key Sizes and Strength for Approved Algorithms.<br>1.3.3 Hash functions should be implemented in accordance with Minimum and Equivalent Key Sizes and Strength for Approved Algorithms. |

TABLE 2-continued

Logical Modules, Environment Indicators (EI), and Security Rules

| Included in Logical Modules | EI | Security Rules |
| --- | --- | --- |
| | | 1.3.4 Security to any cryptographic key should not be provided by a key of lesser strength. |
| | | 1.3.5 Public keys and certificates used by the solution should be authenticated up the entire chain to the root certificate authority (CA) at install. |
| | | 1.3.6 Self-signed certificates are prohibited. |
| | | 1.3.7 Mechanisms should be in place to identify expired and revoked certificates, and to prevent continued processing when certificates have expired or been revoked. |
| | | 1.3.8 Each key should have a single unique purpose, and no keys should be used for multiple purposes, such as both signing and encrypting data. |
| | | 1.3.9 Keys used to validate message authenticity should be unique to each endpoint so that signature generated at one end would always be different if generated at the other endpoint. |
| | | 1.3.10 Any key signature or digital fingerprint values should not reveal any bits of the key itself. |
| | | 1.3.11 Key Check Values (KCVs) should be limited to five bytes (10 hexadecimal digits). In addition, hash algorithms used for key fingerprints on secret or private keys should implement SHA256 or stronger, or be truncated to no more than five bytes. |
| All | All | Key Management |
| | | 1.4.1 All key lifecycle management functions and procedures used by the solution should be documented. |
| | | 1.4.2 Cryptographic key-management processes should conform to industry-accepted key-management standards. |
| | | 1.4.3 Key-management techniques should protect the integrity and purpose of all keys used in the solution. |
| | | 1.4.5 Both secret cryptographic keys and private cryptographic keys should be unique per device and/or application. |
| | | 1.4.6 Key management processes for cleartext secret or private keys or key components should ensure split knowledge and dual control principles are enforced. |
| | | 1.4.7 Methods and procedures to revoke compromised public/private key pairs should be documented and implemented. |
| | | 1.4.8 All symmetric key derivation functions should implement one-way functions or other irreversible processes. |
| MCTL MPIN MGWC | All | Key Management |
| | | 1.4.4 Secret cryptographic keys and private cryptographic keys that are used as part of account data security should be maintained in one or more of the following approved forms: |
| | | Encrypted by a key of equal or greater strength. |
| | | Stored within a secure cryptographic device. |
| | | Managed as two or more full-length components. |
| All | RCLD | Key Management |
| | | 1.4.9 Audit logs should be generated and maintained for all key-management activities and all activities involving cleartext key components. The audit log includes: |
| | | Unique identification of the entity that performed each function |
| | | Date and time |
| | | Function being performed |
| | | Purpose |
| | | Success or failure of the activity |
| | | 1.4.10 Retention of key-management audit logs should align with the organization's record retention policies and, at a minimum, be retained for two years subsequent to key destruction. |
| | | 1.4.11 The integrity of audit logs containing key-management activities should be protected from unauthorized modifications or deletion. |
| | | Key management audit logs that are retained in a solution provider's CDE should be stored in accordance with PCI DSS. Otherwise, the environment should comply with the logical and physical security requirements defined in Monitoring and Attestation Environment Basic Protections. |
| | | 1.4.12 Incident response procedures should exist and include activities for reporting and responding to suspicious or confirmed key-related issues, including key compromises. |
| All | All | Secure Channel |
| | | 1.5.1 Connections between different physical and logical components of the solution should be secured. |
| | | 1.5.2 Each secure channel should provide mutual authentication to uniquely identify each component prior to exchanging sensitive data and protect against MITM and replay attacks. |

TABLE 2-continued

| | | |
|---|---|---|
| Logical Modules, Environment Indicators (EI), and Security Rules | | |

| Included in Logical Modules | EI | Security Rules |
|---|---|---|
| | | 1.5.3 Cryptographic keys used to establish secure channels between the solution components and for data encryption should be unique, except by chance. |
| | | 1.5.4 Use of standard protocols should prevent downgrade attacks. |
| MCTL MPIN MGWC | All | Correlatable Data 1.6.1 Solution provider should maintain documentation that includes any data elements created or accepted as input that the solution provider reasonably believes could be used for correlation of account data to CPoC application transactions. 1.6.2 Solution provider should document the countermeasures incorporated in the solution to minimize the potential for correlatable data. |
| All | RCLD | Operational Management 1.7.1 Documented procedures to support the operation of the back-end environments should exist and be demonstrably in use. |
| All | All | Operation Management 1.7.2 The solution provider should have documented risk-assessment policy and procedures that are demonstrably in use and that provide details on: Methods used to assess on-going risk of the solution Thresholds for minimum acceptable CPoC application versions How and when updates to the COTS system baseline are performed How such changes are communicated to affected merchants The risk-assessment policy and procedures should be reviewed at least annually and when there are significant changes to the solution. 1.7.3 A threat-management process should be established to monitor newly discovered vulnerabilities that should impact the security of the solution. A risk assessment of these vulnerabilities should be performed against currently implemented security and attestation controls to: Determine the residual risk Ensure that the vulnerability does not change the baseline integrity of the solution 1.7.4 The solution provider vulnerability management process should be integrated with the threat-management process. 1.7.6 A public vulnerability-management program should be securely implemented and provide confidentiality of the reported vulnerability. 1.7.7 Plans and procedures should be defined, and tested at least annually, to address interruptions to the solution due to unplanned business disruptions, major disasters or failures of service. 1.7.8 Changes and updates of any of the solution components, such as the back-end monitoring system, attestation system, or a remote component of contactless kernel, should follow a formal change-control process. 1.7.9 Reviews should be performed at least quarterly to verify that operational procedures are being followed. Reviews should be performed by personnel assigned to security governance and include the following: Confirmation that all operation-management processes are being performed Confirmation that personnel are following security policies and operational procedures, such as daily log reviews, firewall rule-set reviews, and configuration standards for new systems |
| All | All | Secure Software Development Practices 1.8.1 All software should be developed in accordance with the development process and to the development requirements described in Software Security Requirements. |
| All | All | Development, Maintenance and Dissemination of Solution User Manual 1.9.1 A user manual that provides information about the solution, including identifying control points and security responsibilities for the merchants, should exist and be made available to the merchant. 1.9.2 The solution user manual should be disseminated to merchants who are using the solution at the time of onboarding or upon request. 1.9.3 The solution user manual should be reviewed at least annually and upon changes to the solution, including the COTS device, the contactless COTS application, and the back-end systems. Any changes to the manual should be disseminated to merchants. |

TABLE 2-continued

Logical Modules, Environment Indicators (EI), and Security Rules

| Included in Logical Modules | EI | Security Rules |
|---|---|---|
| All | RAPP ROS RHW | Tamper and Reverse-engineering Protection<br>2.1.1 Documentation should exist and be maintained on how tamper resistance is achieved for each of the supported COTS platforms, including, but not limited to:<br>Code obfuscation<br>Protections provided by specific platforms<br>Reliance on TEE, security processor, or other security features of the COTS devices used<br>2.1.2 The CPoC application should be protected by tamper-resistance measures to protect its code, application, attestation interface code, and any code involved in the use or security of cryptographic keys (both public and private/secret keys) for all the supported COTS platform and protection methods (such as TEE, secure enclave, and white-box cryptography). |
| MATT | All | Tamper and Reverse-engineering Protection<br>2.1.3 The attestation component should have the least privilege required to access proprietary APIs to determine the COTS platform state.<br>2.1.4 Attestation code implemented in the CPoC application should be protected by tamper-resistance features.<br>2.1.7 The CPoC application should implement methods for detecting and reporting the following to the back-end monitoring system:<br>COTS devices that have been rooted, jailbroken, or in developer mode.<br>CPoC application that has been "side loaded" outside normal channels.<br>Status of COTS device sensors and hardware, as allowed by the COTS OS, that can be used to leak sensitive data.<br>All these events should be reported under conditions that include, but are not limited to:<br>When the CPoC application is executed<br>As requested by the CPoC application and back-end attestation components<br>When white-box cryptography or obfuscation methods, implementations, or instantiations are updated<br>2.1.8 A CPoC application that fails tamper checks should be prohibited from accepting account data. |
| MCTL | RAPP ROS RHW | Tamper and Reverse-engineering Protection<br>2.1.5 The contactless kernel, including any configuration files, optional settings, or payment brands public keys embedded or associated with CPoC application, should be protected by tamper-resistant methods to guarantee its integrity.<br>2.1.6 The contactless kernel operation should be immutable, such that transaction processing cannot be interfered by other applications or users on the COTS device. |

Figure 4:
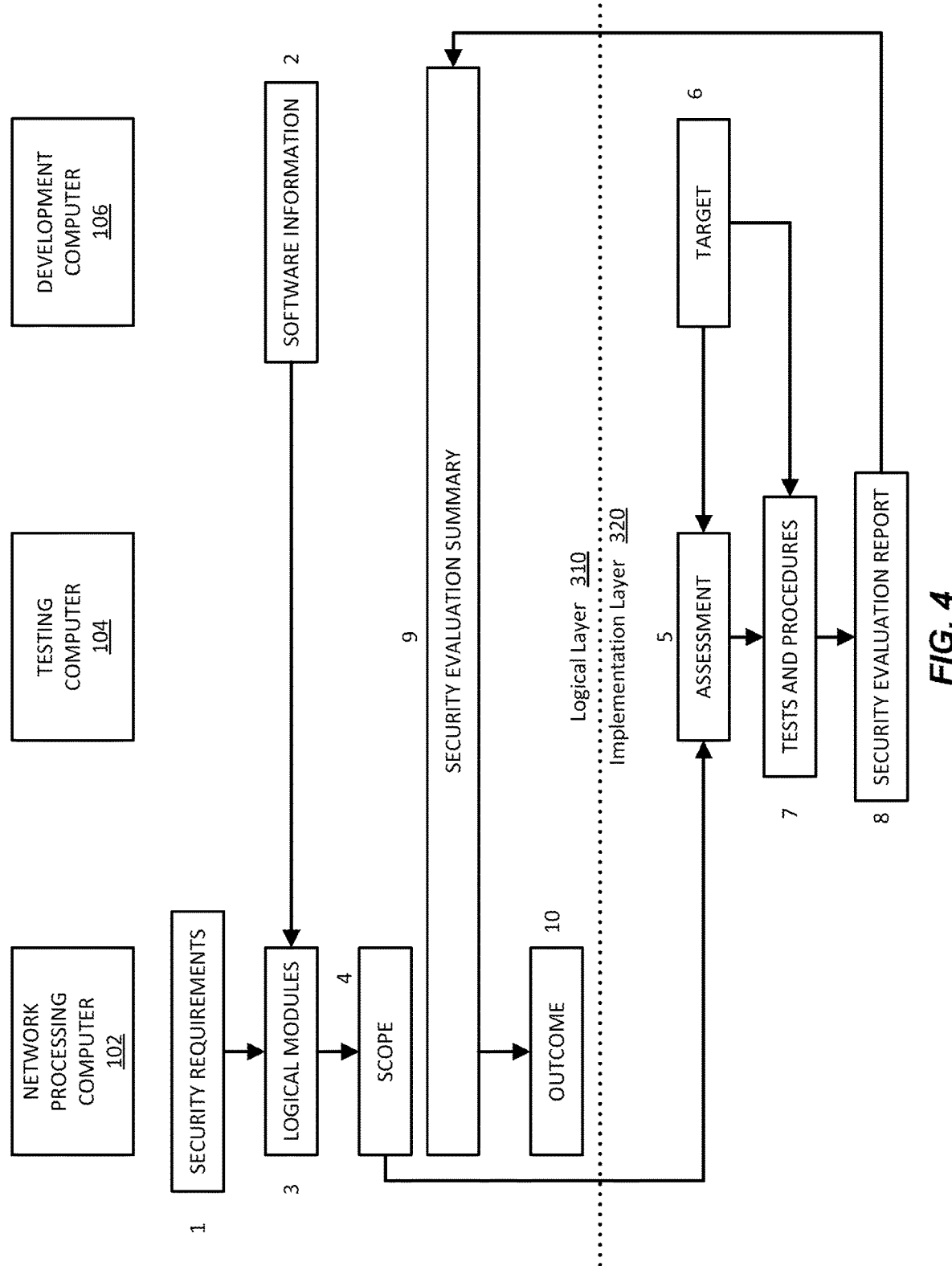
FIG. 4 shows flowchart of a security evaluation process according to embodiments.

FIG. 4 shows a flowchart of a security evaluation process method according to embodiments. The method illustrated in FIG. 4 will be described in the context of a development computer 106 developing software described by software information. It is understood, however, that the invention can be applied to other circumstances.

Steps 1-4 and 9-10 can occur in a logical layer 310. The logical layer 310 can include steps relating to the logic regarding software comprising one or more modules developed by the development computer 106. Steps 5-8 can occur in an implementation layer 302. The implementation layer 320 can include steps relating to the implementation of the software.

At step 1, a network processing computer 102 can define requirements (e.g., security requirements). The network processing computer 102 can generate, or retrieve from memory or a database, a set of security requirements for software. The security requirements can be predetermined and input by an operator of the network processing computer 102.

As an example, a first security requirement can be that "any random numbers used on an off the shelf device for security purposes must be seeded from a value provided from a trusted source combined with input from a random number generator (RNG) on the off the shelf platform or within an application, and at least two other sources of non-deterministic data (e.g., such as user input timing and values collected from lowest bits of on-device analog sensors)." A second security requirement can be that "secret cryptographic keys and private cryptographic keys must be unique per device and/or application." The security requirements can relate to any aspect of maintaining security by a developed software application.

In some embodiments, the network processing computer 102 can determine the security requirements once as an initialization/setup phase of the process illustrated in FIG. 4. The network processing computer 102 can evaluate a plurality of software information using the same security requirements. Overtime, the network processing computer 102 can update, remove, and/or add security requirements.

The security requirements can be within logical modules as security rules. A logical module can include a grouping of security requirements. For example, a first logical module can be a contactless kernel logical module, a PIN capture logical module, a device attestation logical module, a gateway connector logical module, etc. The contactless kernel logical module can include security requirements that relate to interacting with a contactless card via a device's NFC controller as well as capturing and protecting card payment data. The PIN logical module can include security requirements that relate to capturing an online PIN securely on a device. The device attestation logical module can include security requirements that relate to enrolling and monitoring a device, including hardware, operating system and an application as well as ensuring the application is secured on the device. The gateway connector logical module can include security requirements that relate to using a transport key/credential to encrypt and send the captured card data and cardholder credential to endpoint securely.

At step 2, after determining the security requirements, the development computer 106 can provide software information to the network processing computer 102. For example, the development computer 106 can provide the software information to the network processing computer 102 for a security scope determination and subsequently a security evaluation by the testing computer 104.

The software information can include information related to the software that the development computer 106 is developing or has developed. The software information can include, for example, a development computer identifier that identifies the development computer 106, developer information (e.g., company name, contact information, etc.), a software name, a version, build information, digital signature(s), a list of supported modules, any dependencies, any environment indicator(s), and/or included 3<sup>rd</sup> party software development kits.

As an illustrative example, the software information can include a software name of "Super PIN Verifier," a version of "0.8.03," a digital signature created by a private key of the development computer 106, the public key of the development computer 106 corresponding to the private key, an environment indicator of [RAPP] (which indicates that the developed software module is inside an application that will be deployed to devices), and an indication that the software is to process PINs.

In some embodiments, if the software application was updated or changed, then the software information can also include information regarding what portion of the software was changed or what change was made, along with information identifying the software application (e.g., a software application identifier). This information may be used by the network processing computer 102 to later select the appropriate logical modules for testing. For instance, if the application to be tested is a banking application and an update was only made to the cryptographic processing performed by the banking application, then software information such as "cryptography" and an identifier for the banking application can be provided to the network processing computer 102 to help the network processing computer 102 identify the correct logical modules to use for testing. The network processing computer 102 may also use the software application identifier to determine which logical modules have been previously satisfied by the banking application. This can be done so that the network processing computer 102 does not re-test the banking application with those logical modules.

At step 3, the network processing computer 102 can determine one or more logical modules of a plurality of logical modules based on the software information. The network processing computer 102 can determine which logical modules of the plurality of logical modules are relevant to the software information. The network processing computer 102 can determine the one or more logical modules based on the processing capabilities of the software that the software information represents. For example, the network processing computer 102 can evaluate the software information to determine that the software is to process PINs based on the indication of the software is to process PINs.

The network processing computer 102 can obtain, from a logical module database, logical modules that relate to processing PINs. For example, the network processing computer 102 can obtain a PIN capture logical module from the logical module database.

In some embodiments, the network processing computer 102 can filter the plurality of logical modules using the environment indicator included in the software information. The environment indicator can indicate that the software is to be run inside of an application that will be deployed to devices. For example, the environment indicator indicates a software environment inside an interaction application, inside a device operating system, inside device hardware, or inside a cloud-based application. The network processing computer 102 can filter out logical modules from the plurality of logical modules that do not relate to software that is to be run inside of an application that will be deployed to devices.

At step 4, the network processing computer 102 can obtain a scope of evaluation that is to be performed on the software. The scope can include the logical module(s) that are determined from the plurality of logical modules. For example, the network processing computer 102 can determine which logical modules can be used to assess the security of the software.

In some embodiments, the network processing computer 102 can generate a software information identifier for the software information. For example, the network processing computer 102 can generate a software information identifier of "1234." The network processing computer 102 can assign the software information identifier to the software information. The network processing computer 102 can store the software information identifier in association with the software information in memory or a database. For example, the network processing computer 102 can store a dictionary entry including the software information identifier and the software information.

Between steps 4 and 5, the network processing computer 102 can provide the one or more logical modules to the testing computer 104. The network processing computer 102 can also provide the software information identifier along with the one or more logical modules to the testing computer 104. In some embodiments, the network processing computer 102 can further provide the software information along with the one or more logical modules to the testing computer 104. The network processing computer 102 can provide the one or more logical modules to the testing computer 104 over any suitable communication channel.

At steps 5-6, the testing computer 104 can initiate the assessment of the software that is associated with the software information. For example, the testing computer 104 can initiate a security evaluation on a target (e.g., the software that is associated with the software information) received from the development computer 106 at step 6. The testing computer 104 (e.g., a security evaluation lab computer) and the development computer 106 can convert the given logical requirements as indicated by the one or more logical modules into security test requirements and procedures for the software in the implementation layer 320.

As an illustrative example, after receiving the one or more logical modules from the network processing computer 102, the testing computer 104 can generate a software request message requesting the software from the development computer 106. The testing computer 104 can provide the software request message to the development computer 106. The testing computer 104 can determine which computer to send the software request message to based on the software information, for example. After receiving the software request message, the development computer 106 can provide the software to the testing computer 104.

After receiving the software from the development computer 106, the testing computer 104 can initialize the assessment on the software based on the one or more logical modules. For example, the testing computer 104 can obtain security rules from each of the logical modules and determine an assessment that will be able to verify whether the software satisfies each of the security rules individually or in combination.

At step 7, the testing computer 104 can perform the determined security tests on the software. The testing computer 104 evaluates the one or more software modules corresponding to the software information using the one or more logical modules and the security rules contained therein. Any suitable security test can be performed that can determine whether the software satisfies the security requirements included in the logical modules. For example, the testing computer 104 can evaluate each security rule in the one or more logical modules sequentially, checking whether the software satisfies the security rule.

As an illustrative example, the testing computer 104 can evaluate each security rule in the PIN capture logical module received from the network processing computer 102. The testing computer 104 can generate a test for each security rule of the PIN capture logical module. For example, one security rule included in the PIN capture logical module may be that "a seed value, for random numbers, may never be stored in non-volatile memory." The testing computer 104 can evaluate the software for any instances where a seed value is stored in non-volatile memory. If the testing computer 104 determines that the software does store a seed value in non-volatile memory, then the testing computer 104 can generate an indication that the software failed this security rule. If the testing computer 104 determines that the software does not store a seed value in non-volatile memory, then the testing computer 104 can generate an indication that the software passed this security rule.

At step 8, after evaluating each security rule in the one or more logical modules, the testing computer 104 can generate a security evaluation report. The security evaluation report can include a plurality of security rule outcome indicators, which indicate whether the software comprising the one or more software modules passed a particular security rule. The security evaluation report can include a security rule outcome indicator for each security rule of the one or more logical modules. The security evaluation report can include security rule outcome indicators that indicate either pass or fail.

Between steps 8 and 9, the testing computer 104 can provide the security evaluation report to the network processing computer 102. The testing computer 104 can provide the software information identifier along with the security evaluation report to the network processing computer 102. In some embodiments, the testing computer 104 can also provide the evaluation report to the development computer 106.

At step 9, the network processing computer 102 can then generate a security evaluation summary. The network processing computer 102 can generate the security evaluation summary based on the security evaluation report received from the testing computer 104. The security evaluation summary can include an allowance indicator that indicates whether the development computer 106 can proceed with distributing the one or more software modules. The network processing computer 102 can generate the allowance indicator based on the plurality of security rule outcome indicators included in the security evaluation report. For example, the network processing computer 102 can determine how many of the security rule outcome indicators indicate passed and how many indicate failed. The network processing computer 102 can generate an allowance indicator that indicates authorization to distribute the software if all security rule outcome indicators indicate passed, 95% of the security rule outcome indicators indicate passed, 90% of the security rule outcome indicators indicate passed, etc. The network processing computer 102 can make the security evaluation summary available to the testing computer 104 and/or the development computer 106.

At step 10, after generating the security evaluation summary, the network processing computer 102 can generate an outcome message using the security evaluation summary. The outcome message can indicate whether or not the development computer 106 is authorized to distribute the software. The network processing computer 102 can provide the outcome message to the development computer 106.

After receiving the outcome message, the development computer 106 can distribute the software if the outcome message indicates that the development computer 106 is authorized to distribute the software. If the outcome message indicates that the development computer 106 is not authorized to distribute the software, then the development computer 106 can edit the software and can provide new software information for the modified software to the network processing computer 102.

In some embodiments, the network processing computer can generate an expiry date for the one or more software modules of the software that has been authorized to be distributed by the development computer 106.

In some embodiments, if the software comprises more than one software modules, then each software module can be evaluated in terms of logical modules and testing individually. If a first software module receives an outcome message that indicates that the first software module passed testing, while a second software module receives an outcome message that indicates that the second software module did not pass testing, then the development computer 106 may only need to modify the second software module and not the first software module. The development computer 106 can then resubmit the second software module for testing, but need not resubmit the first software module. In such cases, the network processing computer 102 can determine which logical modules have already been satisfied by the software module(s) can determine to only test logical modules that have either not been satisfied or not yet tested.

In the flow described above, the process may be run with respect to an entirely new application with a number of software modules that may need to satisfy a number of logical modules (i.e., one that has never been tested by the testing computer). It may also be run for a discrete number of software modules in a software application using specific logical modules pertinent to those software modules. It may still further be run for an entire application that has had a small number of changes (e.g., an update) to one or more parts of the application. The application would be tested with respect to only those logical modules relevant to the update.

Embodiments of the disclosure have several advantages. For example, embodiments provide for improved software security evaluation time. The security evaluation of the software is more efficient than previous methods, because if one change is made to the software, then only the relevant logical modules can be retested rather than retesting the software using all of the logical modules. Additionally, only the modified software modules need to be tested after a change, rather than all software modules. Thus, embodiments save computing resources and time.

Embodiments provide for several additional advantages. For example, embodiments allow for mixing software code within a single software module that can achieve the security requirements of multiple logical modules. This is beneficial over current methods that require different software modules to perform different security functions.

Although the steps in the flowcharts and process flows described above are illustrated or described in a specific order, it is understood that embodiments of the invention may include methods that have the steps in different orders. In addition, steps may be omitted or added and may still be within embodiments of the invention.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g., a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:
receiving, by a network processing computer, software information from a development computer;
determining, by the network processing computer, one or more logical modules of a plurality of logical modules based on the software information, the logical modules being logically self-contained so security requirements of the logical modules can be met without other logical modules' support, the logical modules also comprising security rules for software modules;
providing, by the network processing computer, the one or more logical modules to a testing computer, wherein the testing computer evaluates one or more software modules corresponding to the software information using the one or more logical modules, wherein the one or more software modules are in a software application;
receiving, by the network processing computer, a security evaluation report from the testing computer based on the evaluation of the one or more software modules using the one or more logical modules; and
creating, by the network processing computer, a security evaluation summary based on the security evaluation report,
wherein the software information comprises an environment indicator, and
wherein the environment indicator indicates a software environment inside an interaction application, inside a device operating system, inside device hardware, or inside a cloud-based application, and wherein the plurality of logical modules include a contactless kernel logical module, a PIN capture logical module, a device attestation logical module, and a gateway connector logical module.

2. The method of claim 1, wherein the testing computer evaluates the one or more software modules using one or more security rules included in each of the one or more logical modules.

3. The method of claim 1 further comprising:
generating, by the network processing computer, an outcome message using the security evaluation summary; and
providing, by the network processing computer, the outcome message to the development computer.

4. The method of claim 1 further comprising:
filtering, by the network processing computer, the plurality of logical modules using the environment indicator.

5. The method of claim 1, wherein the software information indicates that the software application has not been tested by the testing computer.

6. The method of claim 1, wherein the software information indicates that only the one or more software modules in the software application have been changed or been updated.

7. The method of claim 1 further comprising:
generating, by the network processing computer, a software information identifier.

8. The method of claim 7, wherein the security evaluation report further comprises the software information identifier and wherein providing the one or more logical modules to the testing computer further comprises:
providing, by the network processing computer, the one or more logical modules and the software information identifier to the testing computer.

9. The method of claim 1, wherein the software application is a banking application.

10. A network processing computer comprising:

a processor; and a computer readable medium coupled to the processor, the computer readable medium comprising code, executable by the processor, to implement a method comprising:

receiving, by the network processing computer, software information from a development computer;

determining, by the network processing computer, one or more logical modules of a plurality of logical modules based on the software information, the logical modules being logically self-contained so security requirements of the logical modules can be met without other logical modules' support, the logical modules also comprising security rules for software modules;

providing, by the network processing computer, the one or more logical modules to a testing computer, wherein the testing computer evaluates one or more software modules corresponding to the software information using the one or more logical modules, wherein the one or more software modules are in a software application;

receiving, by the network processing computer, a security evaluation report from the testing computer based on the evaluation of the one or more software modules using the one or more logical modules; and creating, by the network processing computer, a security evaluation summary based on the security evaluation report, wherein the software information comprises an environment indicator, and wherein the environment indicator indicates a software environment inside an interaction application, inside a device operating system, inside device hardware, or inside a cloud-based application, and wherein the plurality of logical modules include a contactless kernel logical module, a PIN capture logical module, a device attestation logical module, and a gateway connector logical module.

11. The network processing computer of claim 10, wherein the method further comprises:

obtaining, by the network processing computer, the plurality of logical modules from a database, wherein determining the one or more logical modules further comprises:

filtering, by the network processing computer, the plurality of logical modules with the environment indicator.

12. The network processing computer of claim 10, wherein the testing computer evaluates the one or more software modules using one or more security rules included in each of the one or more logical modules.

13. The network processing computer of claim 12, wherein the one or more security rules include random number generation rules, cryptography rules, secure channel generation rules, correlatable data rules, tamper and reverse-engineering protection rules, online processing rules, application authenticity rules, secure provisioning rules, data encryption rules, and/or attestation mechanism rules.

14. The network processing computer of claim 10, wherein the method further comprises:

generating, by the network processing computer, an outcome message using the security evaluation summary; and providing, by the network processing computer, the outcome message to the development computer.

15. The network processing computer of claim 10, wherein the security evaluation report includes one or more security rule outcome indicators indicating whether each of one or more security rules included in each of the one or more logical modules is satisfied by the one or more software modules.

16. The network processing computer of claim 10, wherein the security evaluation summary includes an allowance indicator that indicates whether the development computer can proceed with distributing the one or more software modules.

17. The network processing computer of claim 10, wherein the security evaluation report further comprises a software information identifier, and wherein the method further comprises:

generating, by the network processing computer, the software information identifier; and providing, by the network processing computer, the one or more logical modules and the software information identifier to the testing computer.

18. A system comprising:

a network processing computer comprising:

a first processor; and a first computer readable medium coupled to the first processor, the first computer readable medium comprising code, executable by the first processor, to implement a first method comprising:

receiving, by the network processing computer, software information from a development computer;

determining, by the network processing computer, one or more logical modules of a plurality of logical modules based on the software information, the logical modules being logically self-contained so security requirements of the logical modules can be met without other logical modules' support, the logical modules also comprising security rules for software modules;

providing, by the network processing computer, the one or more logical modules to a testing computer;

receiving, by the network processing computer, a security evaluation report from the testing computer; and creating, by the network processing computer, a security evaluation summary based on the evaluation, wherein the software information comprises an environment indicator, and wherein the environment indicator indicates a software environment inside an interaction application, inside a device operating system, inside device hardware, or inside a cloud-based application, and wherein the plurality of logical modules include a contactless kernel logical module, a PIN capture logical module, a device attestation logical module, and a gateway connector logical module; and the testing computer comprising:

a second processor; and a second computer readable medium coupled to the second processor, the second computer readable medium comprising code, executable by the second processor, to implement a second method comprising:

receiving, by the testing computer, the one or more logical modules from the network processing computer;

evaluating, by the testing computer, one or more software modules using the one or more logical modules, wherein the one or more software modules corresponds to the software information, and the one or more software modules are in a software application;

generating, by the testing computer, the security evaluation report indicating whether or not the one or more software modules satisfy the security rules included in each of the one or more logical modules; and providing, by the testing computer, the security evaluation report to the network processing computer.

19. The system of claim 18, wherein in the second method, the testing computer evaluates the one or more software modules using one or more security rules included in each of the one or more logical modules, wherein the one or more security rules include random number generation rules, cryptography rules, secure channel generation rules, correlatable data rules, tamper and reverse-engineering protection rules, online processing rules, application authenticity rules, secure provisioning rules, data encryption rules, and/or attestation mechanism rules, and wherein the security evaluation summary includes an allowance indicator that indicates whether or not the development computer can proceed with distributing the one or more software modules.

20. The system of claim 19, wherein the software application is a banking application.

*   *   *   *   *